(12) United States Patent
Ishii et al.

(10) Patent No.: US 7,554,618 B2
(45) Date of Patent: Jun. 30, 2009

(54) LIQUID CRYSTAL DISPLAY DEVICE HAVING CROSSTALK PREVENTING STRUCTURE

(75) Inventors: Hiromitsu Ishii, Mitaka (JP); Yayoi Nakamura, Hino (JP); Shigeru Morikawa, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 262 days.

(21) Appl. No.: 11/633,390

(22) Filed: Dec. 1, 2006

(65) Prior Publication Data

US 2007/0126942 A1 Jun. 7, 2007

(30) Foreign Application Priority Data

Dec. 2, 2005 (JP) ............................. 2005-348904

(51) Int. Cl.
*G02F 1/1343* (2006.01)
(52) U.S. Cl. ......................... 349/38; 349/43; 349/138; 349/152
(58) Field of Classification Search .................. 349/38, 349/43, 138, 143, 139, 152, 113, 149
See application file for complete search history.

(56) References Cited

U.S. PATENT DOCUMENTS 6,423,973 B2 * 7/2002 Choo et al. ............ 250/370.09

FOREIGN PATENT DOCUMENTS

JP 2004-341185 A 12/2004

* cited by examiner

*Primary Examiner*—Thoi V Duong
(74) *Attorney, Agent, or Firm*—Frishauf, Holtz, Goodman & Chick, P.C.

(57) ABSTRACT

In the present liquid crystal display device, a switching element, a data line connected to one end of the switching element, and an interconnecting wire insulated from the data line are formed on a substrate. The switching element, the data line, and the interconnecting wire are covered with an interlayer insulating film. An auxiliary capacitor electrode made of reflective metal and connected to the interconnecting wire is formed on the interlayer insulating film. An upper insulating film is formed on the interlayer insulating film to cover the auxiliary capacitor electrode, and a pixel electrode connected to the other end of the switching element is formed on the upper insulating film. The interconnecting wire is made of a material different from the auxiliary capacitor electrode, and the interlayer insulating film and upper insulating film have a contact hole which reaches the interconnecting wire.

25 Claims, 18 Drawing Sheets

LIQUID CRYSTAL DISPLAY DEVICE HAVING CROSSTALK PREVENTING STRUCTURE

BACKGROUND OF THE INVENTION

1. Field of the Invention

The present invention relates to a liquid crystal display device having a crosstalk preventing structure.

2. Description of the Related Art

Such a conventional active matrix liquid crystal display device is known, which has a structure in which pixel electrodes are formed on an overcoat film that covers thin film transistors. In this structure, the data lines and scanning lines which are connected to the thin film transistors are formed under the overcoat film. Therefore, the pixel electrodes formed on the overcoat film are positioned above the data lines and scanning lines and will not short-circuit to these lines. Thus, the edges of each pixel electrode can be positioned to be overlaid above the data lines and scanning lines, making it possible to increase the aperture ratio.

However, in the above-described case, since the structure is such that the data lines and the pixel electrodes are insulated by a single-layer insulating film, a parasitic capacitance is produced therebetween, leading to the occurrence of a so-called vertical crosstalk phenomenon, which leaves lines dragging in the background of a black display.

As a measure for this, a liquid crystal display device described in Unexamined Japanese Patent Application KOKAI Publication No. 2004-341185 has an auxiliary capacitor line between a data line and a pixel electrode. Since a common potential is supplied to the auxiliary capacitor lines, no parasitic capacitance is produced between the data lines and the pixel electrodes, and the vertical crosstalk is thus prevented.

The above-indicated prior document also describes a semi-transmissive reflective liquid crystal display device. In order to have a large ratio of aperture over the total of transmissive and reflective regions, this liquid crystal display device has its auxiliary capacitor electrodes made of high reflectivity metal such as aluminum-based metal, silver-based metal, etc., and has its thin film transistors and their surroundings covered with the auxiliary capacitor electrodes and pixel electrodes. Thereby, the auxiliary capacitor electrodes positioned in the regions corresponding to the thin film transistors and their surroundings function as reflective plates for reflecting external light.

However, the above-indicated prior document does not describe a structure in which auxiliary capacitor electrodes are connected to the outside. Just for an assumption, in a case where auxiliary capacitor electrode connection pads made of the same material (a transparent conductive material such as ITO (Indium Tin Oxide), etc.) as the pixel electrodes are formed on the same layer as the pixel electrodes, the auxiliary capacitor electrode connection pads are to be connected to connection pad portions constituted by a part of the auxiliary capacitor electrodes, through contact holes formed in an insulating film under the auxiliary capacitor electrode connection pads. However, the auxiliary capacitor electrode connection pads made of a transparent conductive material such as ITO, etc. and the connection pad portions of the auxiliary capacitor electrodes made of high reflectivity metal such as aluminum-based metal, silver-based metal, etc. have a large contact resistance with respect to each other, raising a problem that a fine ohmic contact cannot be formed.

SUMMARY OF THE INVENTION

Hence, an object of the present invention is to provide a liquid crystal display device which has its auxiliary capacitor electrodes made of high reflectivity metal such as aluminum-based metal, silver-based metal, etc. so that the auxiliary capacitor electrodes themselves have a reflective plate function, and which is capable of reducing the contact resistance at connection pad portions.

To achieve the above object, according to the present invention, a switching element, a data line connected to one end of the switching element, and an interconnecting wire insulated from the data line are formed on a substrate. The switching element, the data line, and the interconnecting wire are covered with an interlayer insulating film. An auxiliary capacitor electrode made of reflective metal and connected to the interconnecting wire is formed on the interlayer insulating film. An upper insulating film is formed on the interlayer insulating film to cover the auxiliary capacitor electrode, and a pixel electrode connected to the other end of the switching element is formed on the upper insulating film. The interconnecting wire is made of a material different from that of the auxiliary capacitor electrode, and the interlayer insulating film and upper insulating film have a contact hole which reaches the interconnecting wire.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

Figure 1:
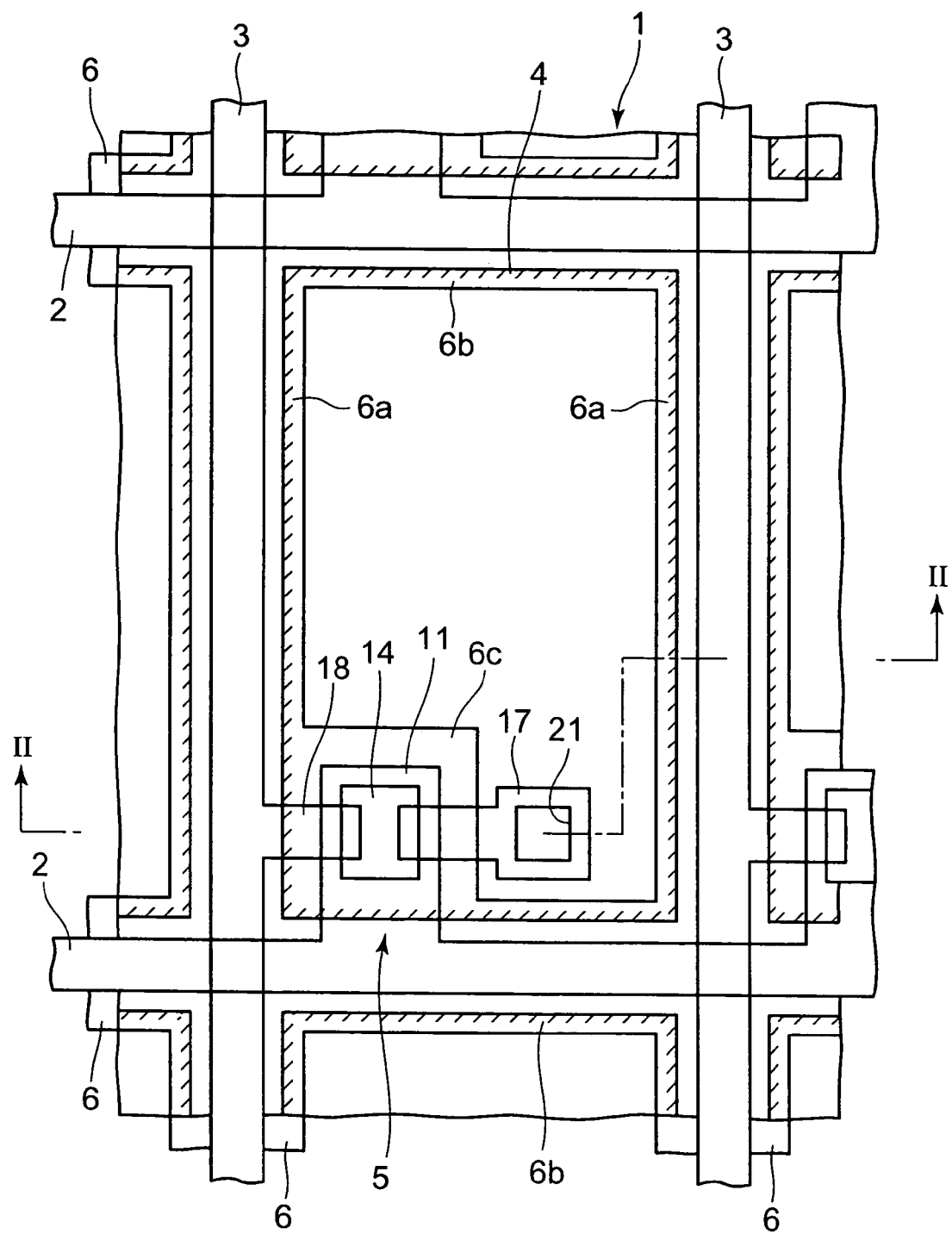
FIG. 1 is a transparent plan view of a principal part of an active matrix semi-transmissive reflective liquid crystal display device as a first embodiment of the present invention.

FIG. 1 shows a transparent plan view of a principal part of an active matrix semi-transmissive reflective liquid crystal display device as the first embodiment of the present invention. The liquid crystal display device comprises a glass substrate 1. Scanning lines 2 and data lines 3 are formed in a matrix, at the side of the upper surface of the glass substrate 1. Pixel electrodes 4 are formed in the regions enclosed by the scanning lines 2 and the data lines 3, so as to be connected to the scanning lines 2 and the data lines 3, via a thin film transistor 5 as a switching element. Further, an auxiliary capacitor electrode 6 having generally a lattice shape is formed in parallel with the scanning lines 2 and the data lines 3. Here, in order to facilitate understanding, hatching by slanted short solid lines is applied at the edges of each pixel electrode 4 in FIG. 1.

In this case, the pixel electrode 4 having a rectangular shape is arranged inside a region likewise having a rectangular shape enclosed by the scanning lines 2 and the data lines 3, such that the pixel electrode 4 is as close as possible to the scanning lines 2 and the data lines 3. The four edges of each pixel electrode 4 are overlaid above the latticed auxiliary capacitor electrode 6 arranged around the pixel electrode 4. The thin film transistor 5 under each pixel electrode 4 at the lower left corner of the pixel electrode 4, and most of the thin film transistor 5 is covered with the pixel electrode 4 as shown in FIG. 1.

The auxiliary capacitor electrode 6 has generally a lattice shape, and comprises first auxiliary capacitor electrode portions 6a which are overlaid above the data lines 3, second auxiliary capacitor electrode portions 6b which are overlaid above the scanning lines 2, and third auxiliary capacitor electrode portions 6c which are overlaid above the thin film transistors 5. In this case, as will be described later, the auxiliary capacitor electrode 6 is formed on a layer different from where the scanning lines 2 are formed, and particularly the first auxiliary capacitor electrode portion 6a of the auxiliary capacitor electrode 6 is formed between the data line 3 and the pixel electrode 4 with insulating films interposed between the portion 6a and the data line 3, and between the portions 6a and the pixel electrode 4, in the thickness-wise direction, i.e., the direction vertical to the sheet of FIG. 1.

The width of the first auxiliary capacitor electrode portion 6a is formed to be larger than the width of the data line 3 by some degree. This enables the first auxiliary capacitor electrode portion 6a to securely cover the data line 3 so that the data line 3 does not directly face the pixel electrode 4 even if the first auxiliary capacitor electrode portion 6a positionally slides in the direction perpendicular to the data line 3. Further, the first auxiliary capacitor electrode portion 6a is arranged almost entirely over the length of the data line 3. This enables the first auxiliary capacitor electrode portion 6a to securely meet the left or right edge of the pixel electrode 4 even if the first auxiliary capacitor electrode portion 6a positionally slides with respect to the pixel electrode 4 in the direction parallel with the data line 3, thereby to securely prevent fluctuations in the auxiliary capacitance due to any positional slide in that direction.

The width of the second auxiliary capacitor electrode portion 6b is formed to be larger than the width of the scanning line 2 by some degree. Thus, the second auxiliary capacitor electrode portion 6b is securely overlaid above the scanning line 2, even if the second auxiliary capacitor electrode portion 6b positionally slides in the direction perpendicular to the scanning line 2. Further, the second auxiliary capacitor electrode portion 6b is arranged almost entirely over the length of the scanning line 2. Therefore, the second auxiliary capacitor electrode portion 6b securely meets the upper or lower edge of the pixel electrode 4 even if the auxiliary capacitor electrode portion 6b positionally slides with respect to the pixel electrode 4 in the direction parallel with the scanning line 2, thereby to securely prevent fluctuations in the auxiliary capacitance due to any positional slide in that direction.

The third auxiliary capacitor electrode portion 6c is formed to have a size that covers almost the entire part of the thin film transistor 5. Thereby, the third auxiliary capacitor electrode portion 6c securely prevents the incidence of external light into the thin film transistor 5. Further, since the region of the pixel electrode 4 other than its substantial transmissive pixel region is covered with the auxiliary capacitor electrode 6 having generally a lattice shape, there is no need of preparing a light leak preventing black mask on an opposing glass substrate (unillustrated) to be disposed above the glass substrate 1, making it possible to increase the aperture ratio.

Here, the auxiliary capacitor electrode 6 is made of high reflectivity metal such as aluminum-based metal, silver-based metal, etc. Of the auxiliary capacitor electrode 6, the regions above which the pixel electrode 4 is overlaid are the regions functioning as reflective plate. In this case, particularly, the third auxiliary capacitor electrode portion 6c, above which the pixel electrode 4 is overlaid, and the first and second auxiliary capacitor electrode portions 6a and 6b near the third auxiliary capacitor electrode 6c are arranged to cover the thin film transistor 5 and its surrounding. This enables the present liquid crystal display device to be used as semi-transmissive reflective type.

Figure 2:
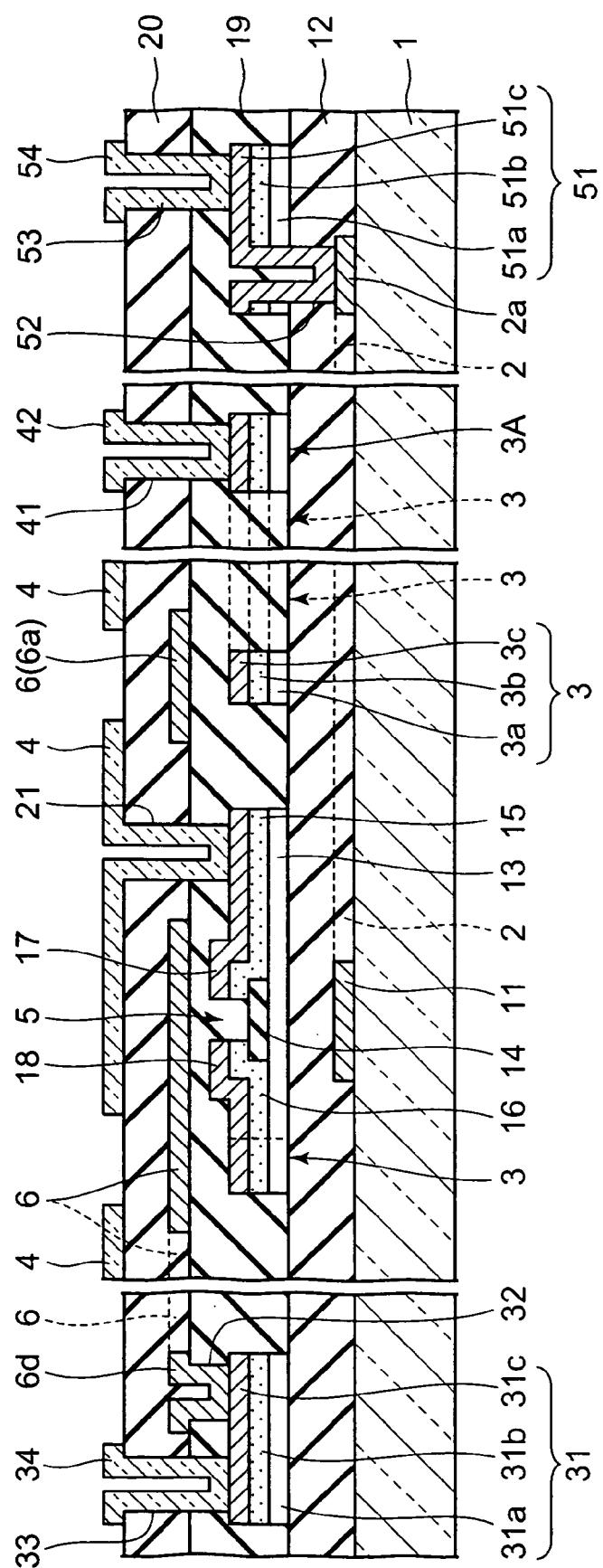
FIG. 2 shows a cross sectional view taken along a II-II line of FIG. 1, and cross sectional views for explaining portions around connection pads.

Next, the specific structure of the present liquid crystal display device will be explained with reference to FIG. 2. In this case, FIG. 2 shows, from its left hand to its right hand, a cross sectional view of a portion around an auxiliary capacitor electrode upper connection pad 34, a cross sectional view of a portion along the II-II line of FIG. 1, i.e., the portion around the thin film transistor 5, the pixel electrode 4, etc., a cross sectional view of a portion around a data line upper connection pad 42, and a cross sectional view of a portion around a scanning line upper connection pad 54.

First, the portion around the thin film transistor 5, the pixel electrode 4, etc. will be explained. A gate electrode 11 made of chromium, molybdenum, or the like, and the scanning line 2 connected to the gate electrode 11 are formed at predetermined positions on the upper surface of the glass substrate 1. A gate insulating film (lower insulating film) 12 made of silicon nitride is formed on the upper surface of the glass substrate 1, the gate electrode 11, and the scanning line 2.

A semiconductor thin film 13 made of intrinsic amorphous silicon is formed at a predetermined position on the upper surface of the gate insulating film 12 above the gate electrode 11. A channel protecting film 14 made of silicon nitride is formed at a predetermined position on the upper surface of the semiconductor thin film 13 above the gate electrode 11. Ohmic contact layers 15 and 16 made of n type amorphous silicon are formed at both sides of the upper surface of the channel protecting film 14 and on the upper surface of the semiconductor thin film 13 appearing at both sides of the channel protecting film 14. A source electrode 17 made of chromium, molybdenum, or the like is formed on the upper surface of the ohmic contact layer 15. A drain electrode 18 made of chromium, molybdenum, or the like is formed on the upper surface of the ohmic contact layer 16.

The gate electrode 11, the gate insulating film 12, the semiconductor thin film 13, the channel protecting film 14, the ohmic contact layers 15 and 16, and the source electrode 17 and drain electrode 18 constitute the thin film transistor 5.

The data line 3 is formed at a predetermined position on the upper surface of the gate insulating film 12. In this case, the data line 3 has a three-layered structure which includes an intrinsic amorphous silicon film 3a, an n type amorphous silicon film 3b, and a metallic film 3c made of chromium, molybdenum, or the like, from the bottom upward. The intrinsic amorphous silicon film 3a, the n type amorphous silicon film 3b, and the metallic film 3c are connected to the drain electrode 18, the ohmic contact layer 16, and the semiconductor thin film 13 in the region where the drain electrode 18 is formed.

An interlayer insulating film 19 made of silicon nitride is formed on the upper surface of the gate insulating film 12, the thin film transistor 5, and the data line 3. The auxiliary capacitor electrode 6 made of high reflectivity metal such as aluminum-based metal, silver-based metal, etc. is formed at a predetermined position on the upper surface of the interlayer insulating film 19. An overcoat film (upper insulating film) 20 made of silicon nitride is formed on the upper surface of the interlayer insulating film 19 and the auxiliary capacitor electrode 6. A contact hole 21 is formed in the interlayer insulating film 19 and overcoat film 20 above the source electrode 17. The pixel electrode 4 made of a transparent conductive material such as ITO, etc. is formed at a predetermined position on the upper surface of the overcoat film 20. The pixel electrode is connected to the source electrode 17 through the contact hole 21.

In the liquid crystal display device having the above-described structure, since the first auxiliary capacitor electrode portion 6a having a shape wider than the width of the data line 3 is formed between the data line 3 and the pixel electrode 4, generation of coupling capacitance between the data line 3 and the pixel electrode 4 can be prevented by this first auxiliary capacitor electrode portion 6a. Thus, it is possible to prohibit any vertical crosstalk from being produced, and thereby to improve the display characteristics.

Further, as shown in FIG. 1, since the pixel electrode 4 having a rectangular shape is arranged in the region likewise having a rectangular shape enclosed by the scanning lines 2 and the data lines 3 such that the pixel electrode 4 is as close as possible to the scanning lines 2 and the data lines 3, and the regions of the generally lattice-shaped auxiliary capacitor electrode 6 above which the pixel electrode 4 is overlaid function as the reflective plate, only the portion of the pixel electrode 4 that contacts the source electrode 17 is left as light shielding region, making it possible to increase the aperture ratio over the total of transmissive and reflective regions.

Next, the portion around the auxiliary capacitor electrode upper connection pad 34 will be explained. An auxiliary capacitor electrode interconnecting wire 31 having a three-layered structure including, from the bottom upward, an intrinsic amorphous silicon film 31a, an n type amorphous silicon film 31b, and a metallic film 31c made of chromium, molybdenum, or the like is formed at a predetermined position on the upper surface of the gate insulating film 12. A contact hole 32 is formed in the interlayer insulating film 19 above one end portion of the auxiliary capacitor electrode interconnecting wire 31. A contact hole 33 is formed in the interlayer insulating film 19 and overcoat film 20 above a connection pad portion constituted by the other end portion of the auxiliary capacitor electrode interconnecting wire 31.

A contact region 6d, which is a part of the auxiliary capacitor electrode 6 formed on the upper surface of the interlayer insulating film 19 is connected to the one end portion of the auxiliary capacitor electrode interconnecting wire 31 (the metallic film 31c) through the contact hole 32. The auxiliary capacitor electrode upper connection pad 34, which is made of a transparent conductive material such as ITO, etc., is formed at a predetermined position on the upper surface of the overcoat film 20 so as to be connected to the connection pad portion constituted by the other end portion of the auxiliary capacitor electrode interconnecting wire 31 (the metallic film 31c) through the contact hole 33.

Next, the portion around the data line upper connection pad 42 will be explained. A data line connection pad portion 3A, which is constituted by one end portion of the data line 3 having the three-layered structure is formed at a predetermined position on the upper surface of the gate insulating film 12. A contact hole 41 is formed in the interlayer insulating film 19 and overcoat film 20 above the data line connection pad portion 3A. The data line upper connection pad 42, which is made of a transparent conductive material such as ITO, etc., is formed at a predetermined position on the upper surface of the overcoat film 20 so as to be connected to the data line connection pad portion 3A (metallic film 3c) through the contact hole 41.

Next, the portion around the scanning line upper connection pad 54 will be explained. A scanning line connection pad portion 2a constituted by one end portion of the scanning line 2 is formed at a predetermined position on the upper surface of the glass substrate 1. A scanning line interconnecting wire 51 having a three-layered structure including, from the bottom upward, an intrinsic amorphous silicon film 51a, an n type amorphous silicon film 51b, and a metallic film 51c made of chromium, molybdenum, or the like is formed at a predetermined position on the upper surface of the gate insulating film 12.

A contact hole 52 is formed in the gate insulating film 12, intrinsic amorphous silicon film 51a, and n type amorphous silicon film 51 above the scanning line connection pad portion 2a. One end portion of the metallic film 51c is connected to the scanning line connection pad portion 2a through the contact hole 52.

A contact hole 53 is formed in the interlayer insulating film 19 and overcoat film 20 above a connection pad portion constituted by the other end portion of the scanning line interconnecting wire 51. The scanning line upper connection pad 54, which is made of a transparent conductive material such as ITO, etc., is formed at a predetermined position on the upper surface of the overcoat film 20 so as to be connected to the connection pad portion constituted by the other end portion of the scanning line interconnecting wire 51 (the metallic film 51c).

Here, in the portion around the auxiliary capacitor electrode upper connection pad 34, in a case where the auxiliary capacitor electrode upper connection pad 34 made of a transparent conductive material such as ITO, etc. is directly connected to the contact region 6d of the auxiliary capacitor electrode 6 made of high reflectivity metal such as aluminum-based metal, etc., no fine ohmic contact can be formed therebetween.

Hence, according to the present embodiment, the auxiliary capacitor electrode upper connection pad 34 is connected to the metallic film 31c off the auxiliary capacitor electrode interconnecting wire 31. In this case, since the metallic film 31c of the auxiliary capacitor electrode interconnecting wire 31 is made of metal such as chromium or the like capable of direct electric contact to the auxiliary capacitor electrode upper connection pad 34 made of a transparent conductive material such as ITO, etc., a fine ohmic contact can be formed therebetween.

Further, in this case, since the contact region 6d of the auxiliary capacitor electrode 6 made of high reflectivity metal such as aluminum-based metal or the like is connected to the metallic film 31c, made of chromium or the like, of the auxiliary capacitor electrode interconnecting wire 31, even if a native oxide film having a high resistance is formed on the surface of the auxiliary capacitor electrode 6, the contact resistance between the contact region 6d of the auxiliary capacitor electrode 6 and the metallic film 31c of the auxiliary capacitor electrode interconnecting wire 31 will not become unstable.

In the portion around the data line upper connection pad 42, since the metallic film 3c of the data line connection pad portion 3A is made of metal such as chromium, etc. capable of direct electric contact to the data line upper connection pad 42 made of a transparent conductive material such as ITO, etc., a fine ohmic connection can be formed therebetween.

Furthermore, likewise in the portion around the scanning line upper connection pad 54, since the metallic film 51c of the scanning line interconnecting wire 51 is made of metal such as chromium, etc. capable of direct electric contact to the scanning line upper connection pad 54 made of a transparent conductive material such as ITO, etc., a fine ohmic connection can be formed therebetween.

Incidentally, in the portion around the scanning line upper connection pad 54, the connection pad portion constituted by the other end portion of the scanning line interconnecting wire 51 is arranged in a region other than the region where the scanning line connection pad portion 2a constituted by the one end portion of the scanning line 2 is arranged, thus only the gate insulating film 12 is formed on the glass substrate 1 under the connection pad portion.

Further, likewise in the portion around the data line upper connection pad 42 and in the portion around the auxiliary capacitor electrode upper connection pad 34, only the gate insulating film 12 is formed on the glass substrate 1 under the data line connection pad portion 3A or the connection pad portion constituted by the other end portion of the auxiliary capacitor electrode interconnecting wire 31.

Accordingly, in the portions around the upper connection pads 34, 42, and 54, the substantial connection pad portions constituted by the other end portions of the interconnecting wires 31 and 51 and the data line connection pad portion 3A can be brought up to the same height, making it possible to stabilize the process of forming the contact holes 33, 41, and 53, which are to be formed in a way described later in the overcoat film 20 and interlayer insulating film 19 above the respective connection pad portions, and to increase the connection reliability between the substantial connection pad portions constituted by the other end portions of the interconnecting wires 31 and 51 and data line connection pad portion 3A, and the upper connection pads 34, 42, and 54.

Note that the upper connection pads 34, 42, and 54 made of a transparent conductive material such as ITO, etc. are intended for covering the substantial connection pad portions constituted by the other end portions of the interconnecting wires 31 and 51 and data line connection pad portion 3A to improve their corrosion resistance, and may be omitted though preferably should be provided. However, even in a case where they are omitted, the substantial connection pad portions constituted by the other end portions of the interconnecting wires 31 and 51 and the data line connection pad portion 3A can be brought up to the same height.

Figure 3:
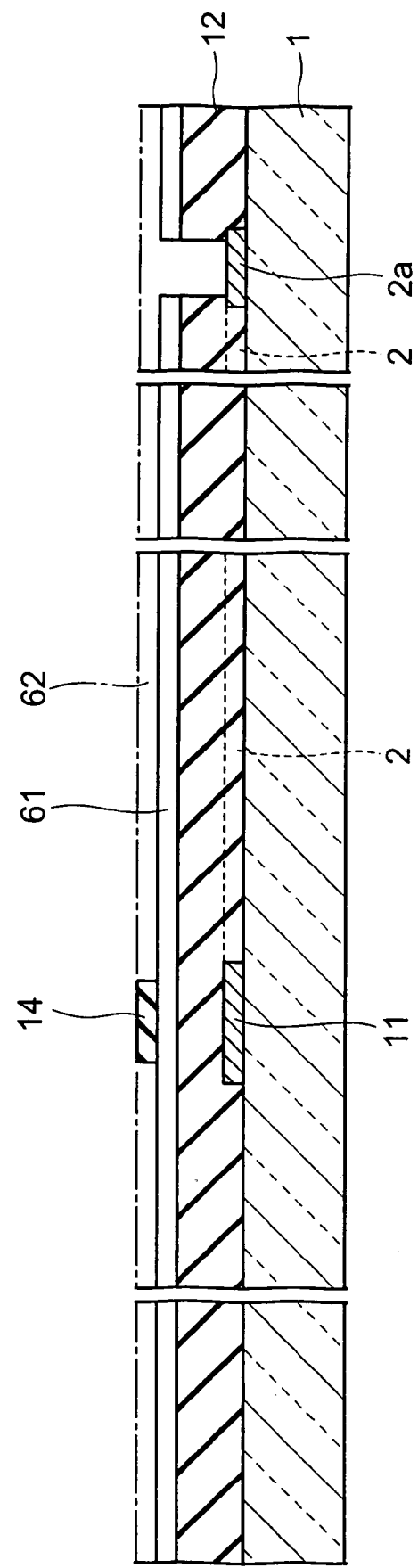
FIG. 3 is a cross sectional view of a starting step, in one example of a manufacturing method of the liquid crystal display device shown in FIG. 2.

Next, an example of the manufacturing method of the liquid crystal display device shown in FIG. 2 will be explained. First, a metal film made of chromium, molybdenum, or the like, which is formed by sputtering, is patterned by photolithography (first time), thereby to form the gate electrode 11, the scanning line 2, and the scanning line connection pad portion 2a at predetermined positions on the upper surface of the glass substrate 1, as shown in FIG. 3.

Next, the gate insulating film 12 made of silicon nitride, an intrinsic amorphous silicon film 61, and a silicon nitride film 62 are sequentially formed by CVD (Chemical Vapor Deposition), on the upper surface of the glass substrate 1, the gate electrode 11, the scanning line 2, and the scanning line connection pad portion 2a. Next, the silicon nitride film 62 is patterned by photolithography (second time) to form the channel protecting film 14.

Figure 4:
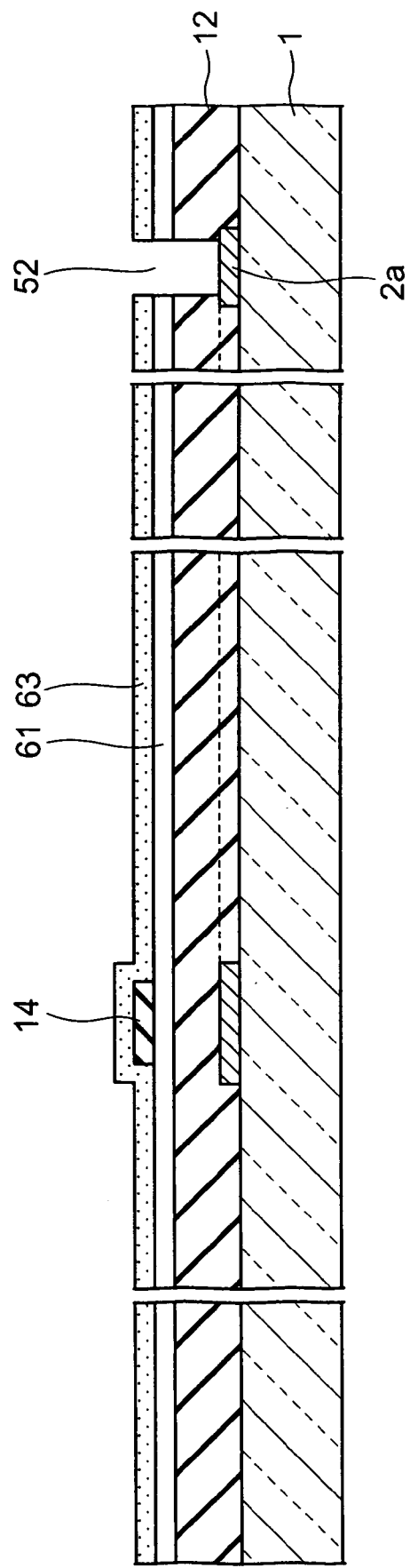
FIG. 4 is a cross sectional view of a step succeeding FIG. 3.

Next, an n type amorphous silicon film 63 is formed by CVD on the upper surface of the intrinsic amorphous silicon film 61 and the channel protecting film 14, as shown in FIG. 4. Then, the contact hole 52 is formed by photolithography (third time) sequentially in the n type amorphous silicon film 63, the intrinsic amorphous silicon film 61, and the gate insulating film 12 above the scanning line connection pad portion 2a.

Figure 5:
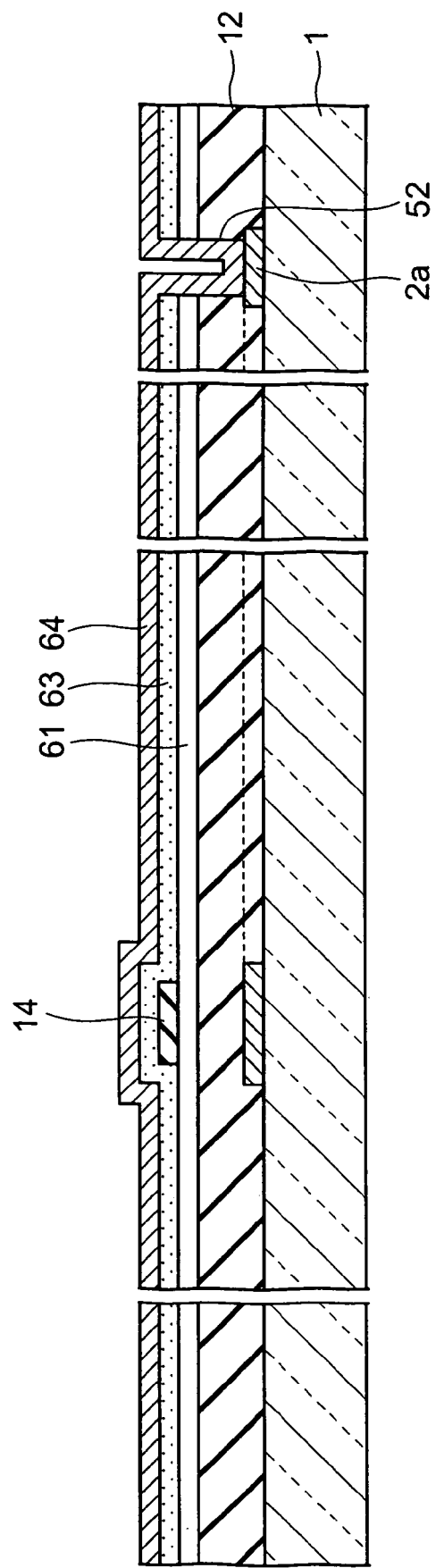
FIG. 5 is a cross sectional view of a step succeeding FIG. 4.

Next, a metallic film 64 made of chromium, molybdenum, or the like is formed by sputtering on the upper surface of the n type amorphous silicon film 63 and on the upper surface of the scanning line connection pad portion 2a that is exposed through the contact hole 52, as shown in FIG. 5. Then, the metallic film 64, the n type amorphous silicon film 63, and the intrinsic amorphous silicon film 61 are sequentially patterned by photolithography (fourth time).

Figure 6:
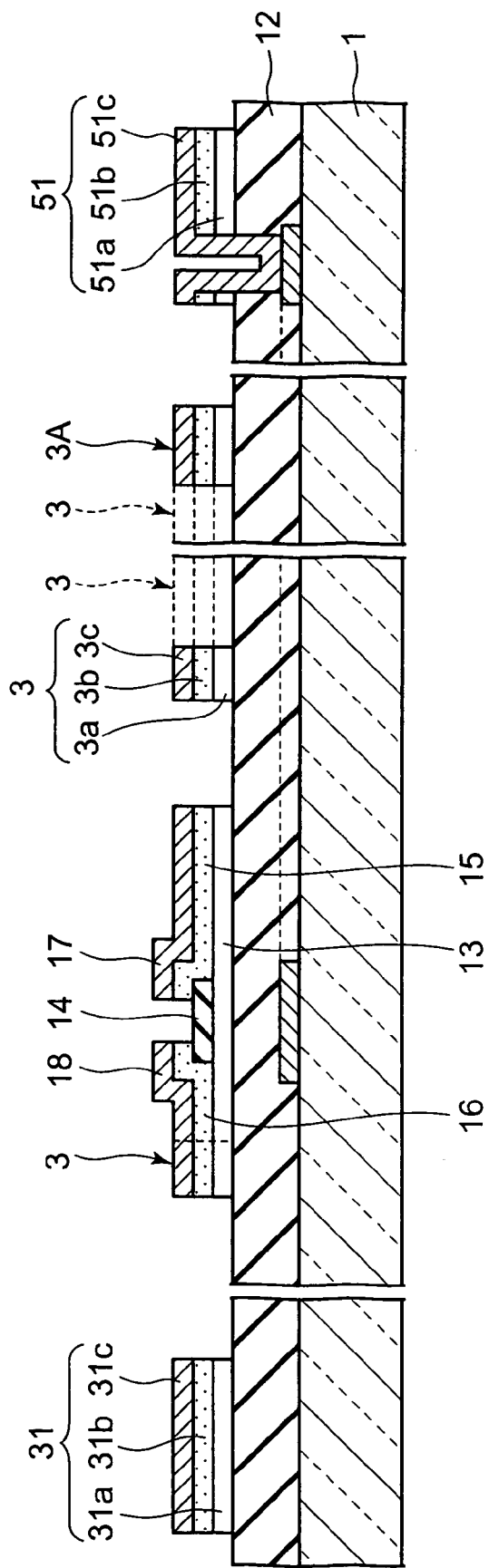
FIG. 6 is a cross sectional view of a step succeeding FIG. 5.

As a result, the semiconductor thin film 13, the ohmic contact layers 15 and 16, the source electrode 17 and drain electrode 18 are formed as shown in FIG. 6. Further, the three-layered data line 3 and data line connection pad portion 3A which include, from the bottom upward, the intrinsic amorphous silicon film 3a, the n type amorphous silicon film 3b, and the metallic film 3c are formed. Furthermore, the three-layered interconnecting wires 31 and 51 which include, form the bottom upward, the intrinsic amorphous silicon film 31a or 51a, the n type amorphous silicon film 31b or 51b, and the metallic film 31c or 51c are formed.

Figure 7:
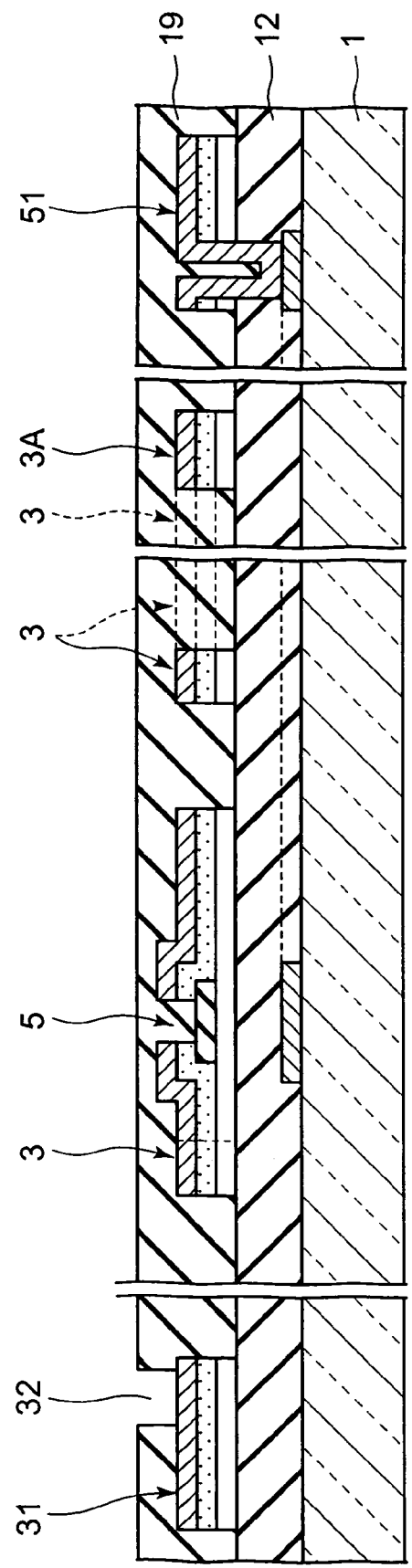
FIG. 7 is a cross sectional view of a step succeeding FIG. 6.

Then, the interlayer insulating film 19 made of silicon nitride is formed by CVD on the upper surface of the gate insulating film 12, the thin film transistor 5, the data line 3, the data line connection pad portion 3A, and the interconnecting wires 31 and 51, as shown in FIG. 7. Next, the contact hole 32 is formed by photolithography (fifth time) in the interlayer insulating film 19 above the one end portion of the auxiliary capacitor electrode interconnecting wire 31.

Figure 8:
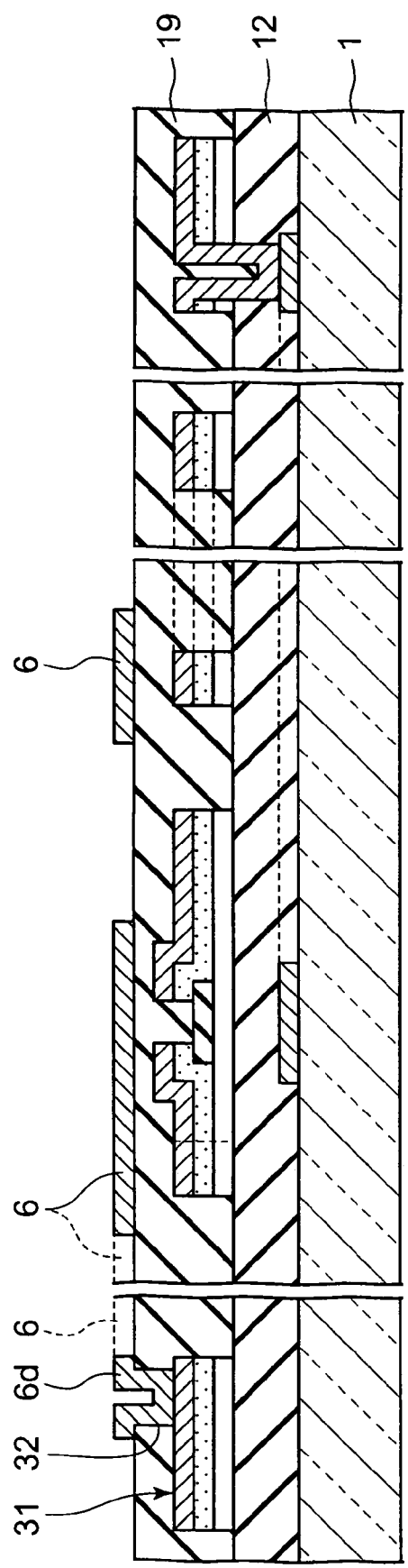
FIG. 8 is a cross sectional view of a step succeeding FIG. 7.

Next, a high reflectivity metal film made of aluminum-based metal or the like, which is formed by sputtering, is patterned by photolithography (sixth time) to form the auxiliary capacitor electrode 6 on the upper surface of the interlayer insulating film 19 and on the upper surface of the one end portion of the auxiliary capacitor electrode interconnecting wire 31 that is exposed through the contact hole 32, as shown in FIG. 8. Further, the contact region 6d of the auxiliary capacitor electrode 6 is formed so as to be connected to the one end portion of the auxiliary capacitor electrode interconnecting wire 31 through the contact hole 32.

Figure 9:
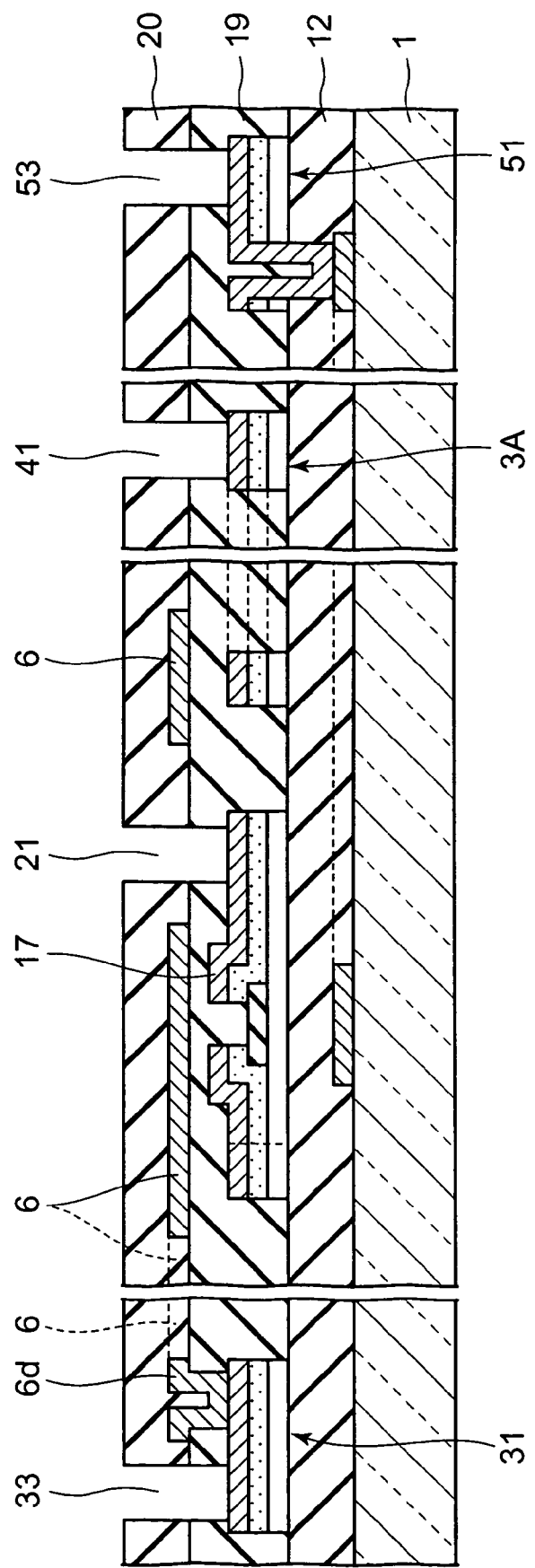
FIG. 9 is a cross sectional view of a step succeeding FIG. 8.

Next, the overcoat film 20 made of silicon nitride is formed by CVD on the upper surface of the interlayer insulating film 19 and the auxiliary capacitor electrode 6 and its contact region 6d, as shown in FIG. 9. Next, the contact holes 21, 33, 41, and 53 are formed by photolithography (seventh time) sequentially in the overcoat film 20 and interlayer insulating film 19 at a predetermined portion above the upper surface of the source electrode 17, and above the other end portion of the auxiliary capacitor electrode interconnecting wire 31, the data line connection pad portion 3A, and the other end portion of the scanning line interconnecting wire 51.

Next, a transparent conductive film made of ITO or the like, which is formed by sputtering on the overcoat film 20 and in the inside of the respective contact holes 21, 33, 41, and 53, is patterned by photolithography (eighth time), thereby to form the pixel electrode 4 to be connected to the source electrode 17 through the contact hole 2, as shown in FIG. 2.

Further, the auxiliary capacitor electrode upper connection pad 34 is formed so as to be connected to the other end portion of the auxiliary capacitor electrode interconnecting wire 31 through the contact hole 33. And the data line upper connection pad 42 is formed so as to be connected to the data line connection pad portion 3A through the contact hole 41. Furthermore, the scanning line upper connection pad 54 is formed so as to be connected to the other end portion of the scanning line interconnecting wire 51 through the contact hole 53. Thus, the liquid crystal display device shown in FIG. 2 is obtained.

Second Embodiment

Figure 10:
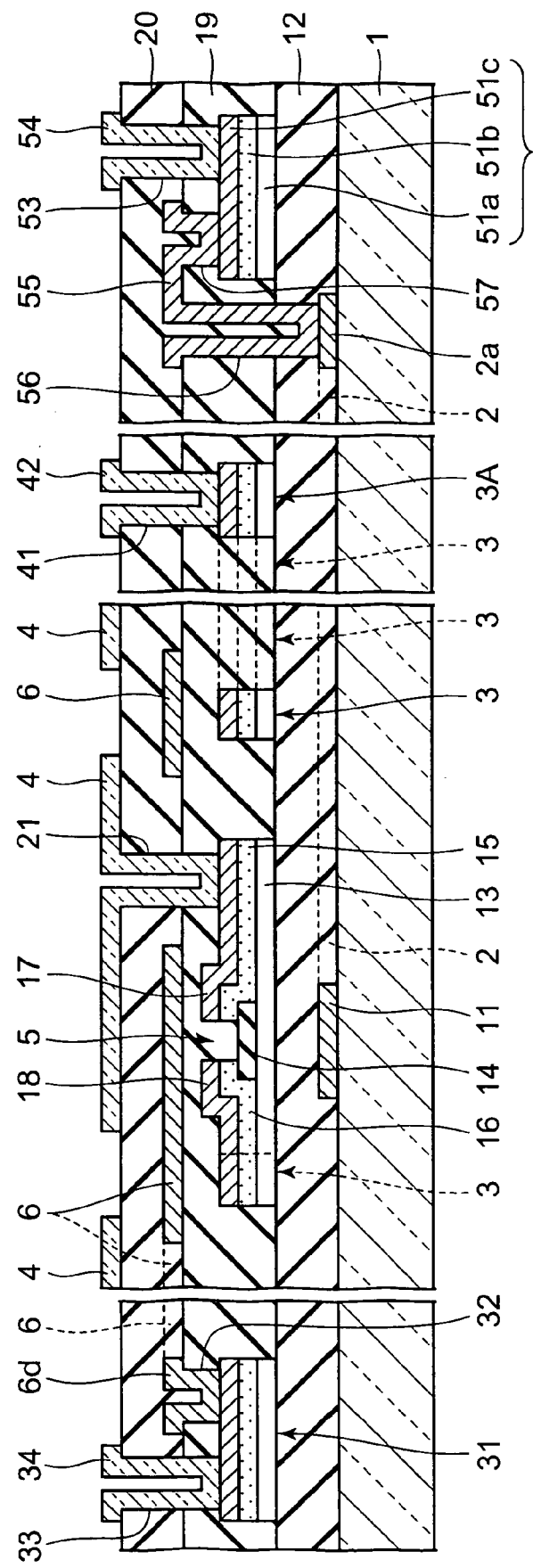
FIG. 10 is a cross sectional view of an active matrix semi-transmissive reflective liquid crystal display device as a second embodiment of the present invention, as taken similarly to FIG. 2.

FIG. 10 is a diagram showing an active matrix semi-transmissive reflective liquid crystal display device as the second embodiment of the present invention. FIG. 10 is a cross sectional view corresponding to the cross sectional view as taken along the II-II line shown in FIG. 1. The present liquid crystal display device differs from the liquid crystal display device shown in FIG. 2, only in the structure of the portion around the scanning line upper connection pad 54.

Specifically, in the portion around the scanning line upper connection pad 54, a first scanning line interconnecting wire 51 having a three-layered structure including, from the bottom upward, an intrinsic amorphous silicon film 51a, an n type amorphous silicon film 51b, and a metallic film 51c is formed at a predetermined position on the upper surface of the gate insulating film 12. A second scanning line interconnecting wire 55 made of high reflectivity metal such as aluminum-based metal, silver-based metal, etc. is formed at a predetermined position on the upper surface of the interlayer insulating film 19.

One end portion of the second scanning line interconnecting wire 55 is connected to the scanning line connection pad portion 2a through a contact hole 56 formed in the interlayer insulating film 19 and gate insulating film 12. The other end portion of the second scanning line interconnecting wire 55 is connected to one end portion of the first scanning line interconnecting wire 51 through a contact hole 57 formed in the interlayer insulating film 19. The scanning line upper connection pad 54 is connected to the other end portion of the first scanning line interconnecting wire 51 through a contact hole 53 formed in the overcoat film 20 and interlayer insulating film 19.

Further, in the portion around the present scanning line upper connection pad 54, since the one end portion of the second scanning line interconnecting wire 55 made of high reflectivity metal such as aluminum-based metal, etc. is connected to the scanning line connection pad portion 2a made of chromium, or the like, and the other end portion thereof is connected to the metallic film 51c, made of chromium, or the like, of the first scanning line interconnecting wire 51, even if a native oxide film having a high resistance is formed on the surface of the second scanning line interconnecting wire 55, the contact resistance between the one end portion or the other end portion of the second scanning line interconnecting wire 55, and the scanning line connection pad portion 2a or the metallic film 51c of the first scanning line interconnecting wire 51 will not be unstable.

According to the above-described first embodiment, photolithography is performed eight times, while according to the second embodiment, it can be reduced to seven times. Hence, one example of the manufacturing method of the liquid crystal display device according to the second embodiment will now be explained. First, the channel protecting film 14 is formed by the second photolithography, as shown in FIG. 3.

Figure 11:
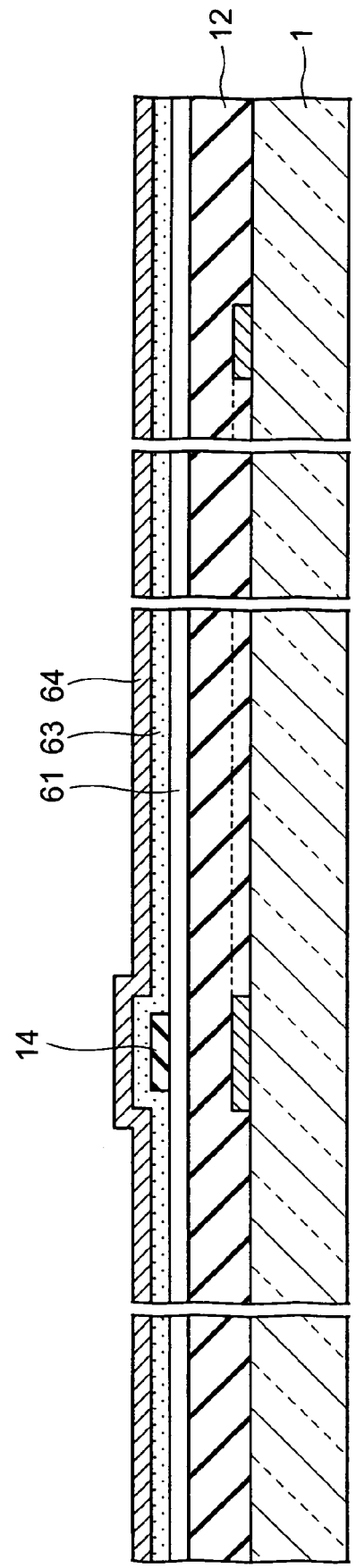
FIG. 11 is a cross sectional view of a certain step, in one example of a manufacturing method of the liquid crystal display device shown in FIG. 10.
Figure 12:
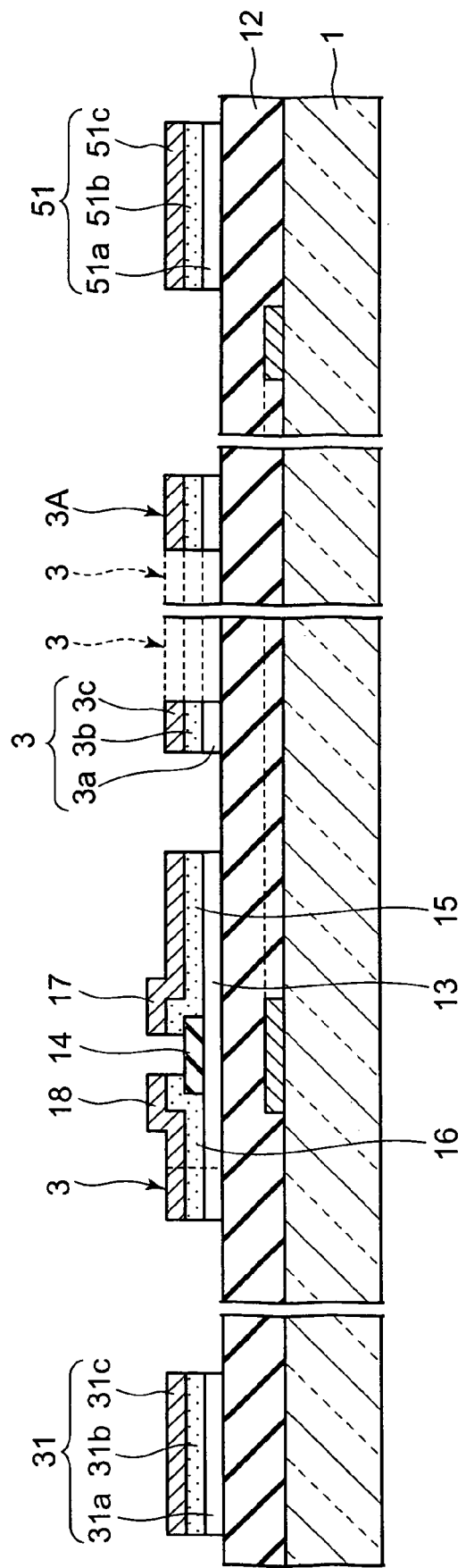
FIG. 12 is a cross sectional view of a step succeeding FIG. 11.

Next, the n type amorphous silicon film 63 is formed by CVD on the upper surface of the intrinsic amorphous silicon film 61 and the cannel protecting film 14, as shown in FIG. 11. Next, the metallic film 64 made of chromium, molybdenum, or the like is formed by sputtering on the upper surface of the n type amorphous silicon film 63. Next, the metallic film 64, the n type amorphous silicon film 63, and the intrinsic amorphous silicon film 61 are sequentially patterned by photolithography (third time), thereby producing a state shown in FIG. 12.

That is, the semiconductor thin film 13, the ohmic contact layers 15 and 16, and the source electrode 17 and drain electrode 18 are formed. Further, the three-layered data line 3 and data line connection pad portion 3A including, from the bottom upward, the intrinsic amorphous silicon film 3a, the n type amorphous silicon film 3b, and the metallic film 3c are formed. Furthermore, the three-layered interconnecting wires 31 and 51 including, from the bottom upward, the intrinsic amorphous silicon film 31a or 51a, the n type amorphous silicon film 31b or 51b, and the metallic film 31c or 51c are formed.

Figure 13:
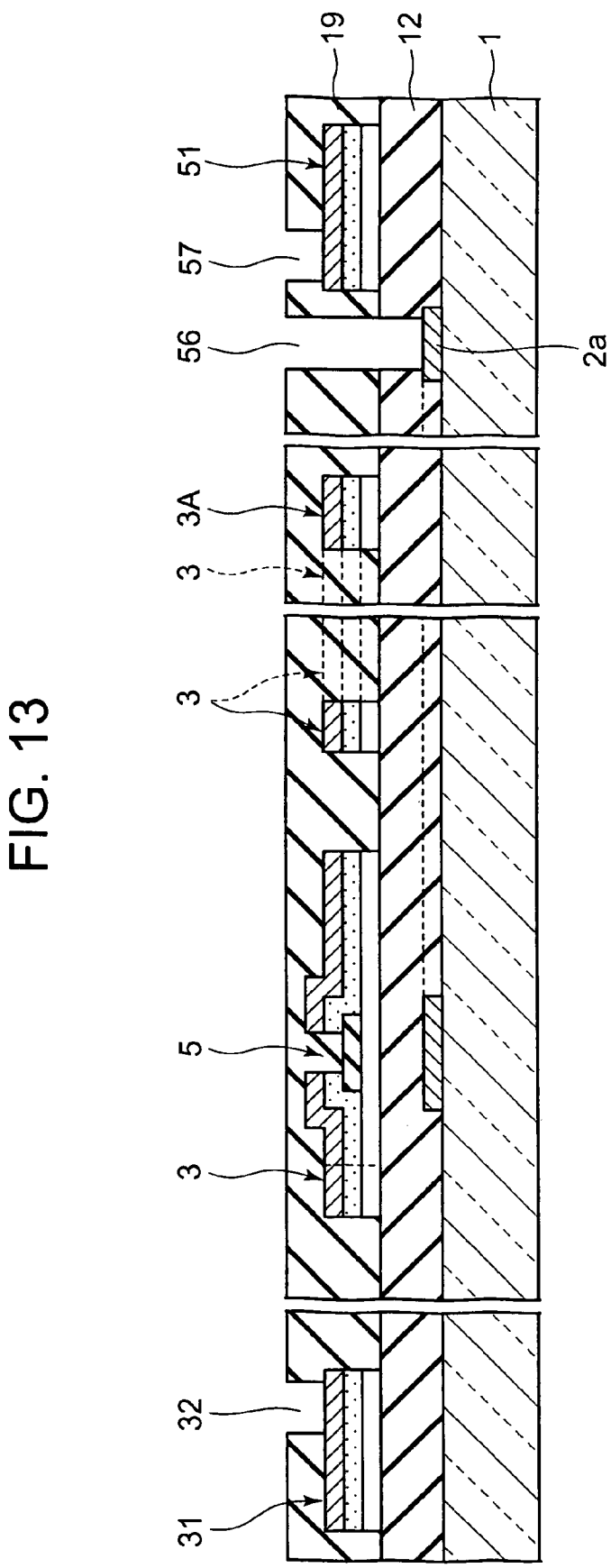
FIG. 13 is a cross sectional view of a step succeeding FIG. 12.

Next, the interlayer insulating film 19 made of silicon nitride is formed by CVD on the upper surface of the gate insulating film 12, the thin film transistor 5, the data line 3, the data line connection pad portion 3A, and the interconnecting wires 31 and 51, as shown in FIG. 13. Next, by photolithography (fourth time), the contact holes 32 and 57 are formed in the interlayer insulating film 19 above the one end portion of each of the interconnecting wires 31 and 51, and the contact hole 56 is formed sequentially in the interlayer insulating film 19 and gate insulating film 12 above the scanning line connection pad portion 2a.

Figure 14:
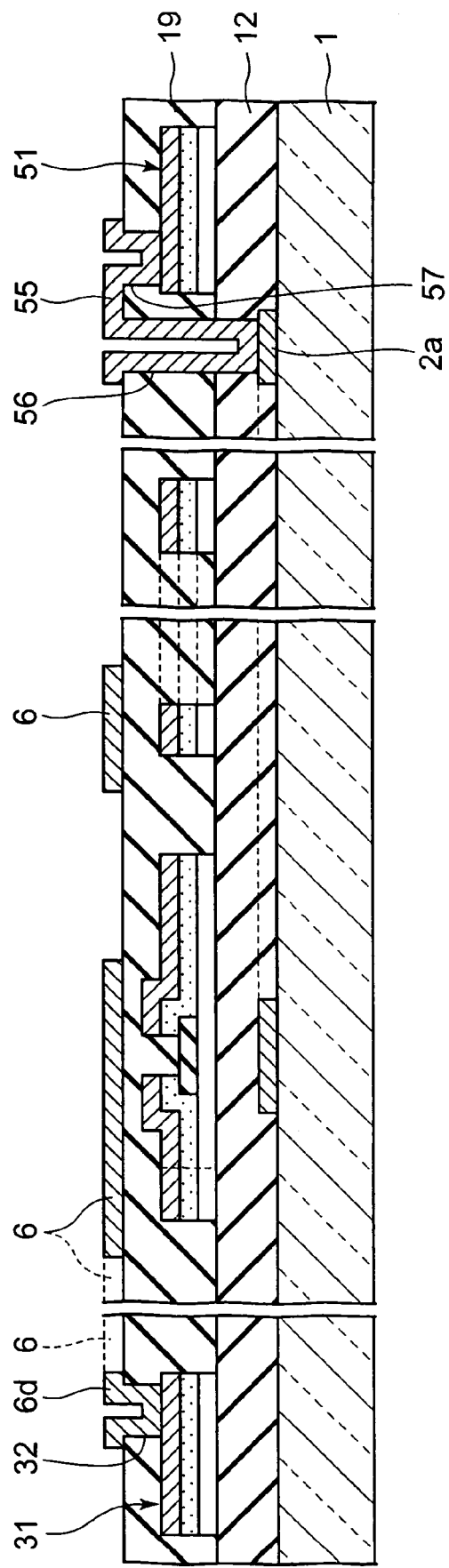
FIG. 14 is a cross sectional view of a step succeeding FIG. 13.

Next, a high reflectivity metal film made of aluminum-based metal or the like, which is formed by sputtering on the surface of the interlayer insulating film 19 and in the contact holes 32, 56, and 57, is patterned by photolithography (fifth time), to form the auxiliary capacitor electrode 6 and to form the contact region 6d of the auxiliary capacitor electrode 6 so as to be connected to the one end portion of the auxiliary capacitor electrode interconnecting wire 31 through the contact hole 32, while also forming the second scanning line interconnecting wire 55 so as to be connected to the scanning line connection pad portion 2a and the one end portion of the first scanning line interconnecting wire 51 through the contact holes 56 and 57, as shown in FIG. 14.

Figure 15:
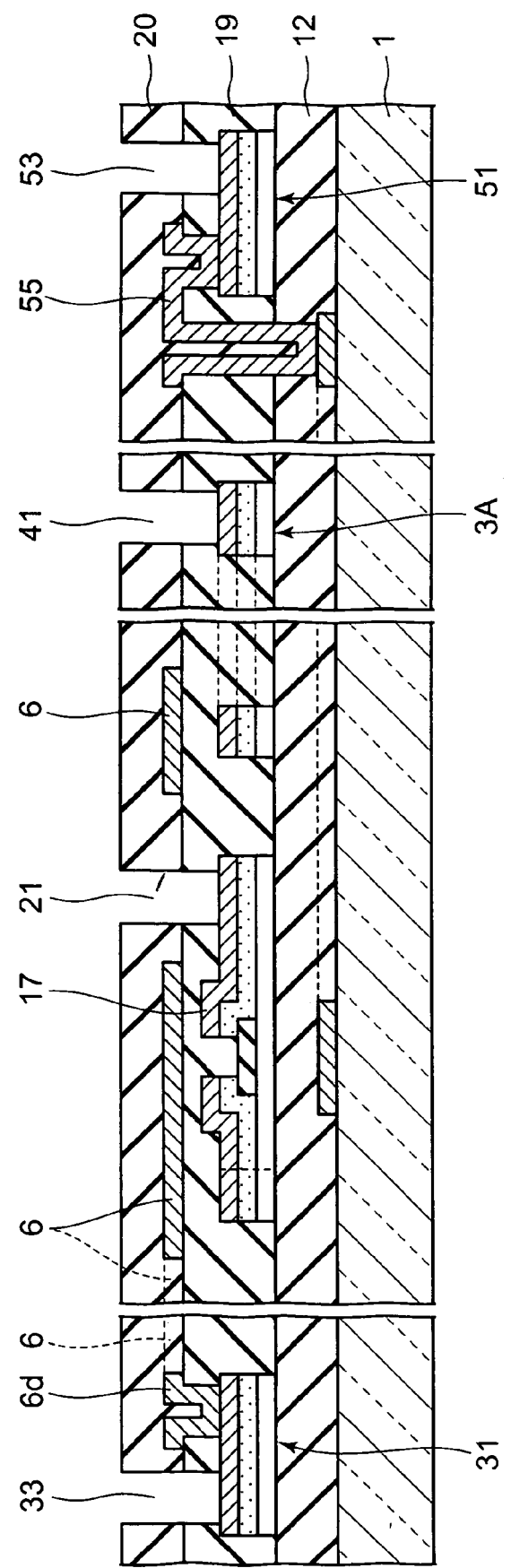
FIG. 15 is a cross sectional view of a step succeeding FIG. 14.

Next, the overcoat film 20 made of silicon nitride is formed by CVD on the upper surface of the interlayer insulating film 19, the auxiliary capacitor electrode 6 and its contact region 6d, and the second scanning line interconnecting wire 55, as shown in FIG. 15. Next, the contact holes 21, 33, 41, and 53 are formed by photolithography (sixth time) sequentially in the overcoat film 20 and interlayer insulating film 19 at a predetermined position above the upper surface of the source electrode 17, and above the other end portion of the auxiliary capacitor electrode interconnecting wire 31, the data line connection pad portion 3A, and the other end portion of the first scanning line interconnecting wire 51.

Next, a transparent conductive film made of ITO or the like, which is formed by sputtering on the upper surface of the overcoat film and in the contact holes 21, 33, 41, and 53, is patterned by photolithography (seventh time), to form the pixel electrode 4 so as to be connected to the source electrode 17 through the contact hole 21, as shown in FIG. 10.

Further, the auxiliary capacitor electrode upper connection pad 34 is formed to be connected to the other end portion of the auxiliary capacitor electrode interconnecting wire 31 through the contact hole 33. And the data line upper connection pad 42 is formed to be connected to the data line connection pad portion 3A through the contact hole 41. Furthermore, the scanning line upper connection pad 54 is formed to be connected to the other end portion of the first scanning line interconnecting wire 51 through the contact hole 53. Thus, the liquid crystal display device shown in FIG. 10 is obtained.

As described above, the manufacturing method of the present liquid crystal display device includes seven photolithography steps, which is reduced by one from the eight times of the above-described first embodiment, making it possible to increase the productivity.

In FIG. 10, since the second scanning line interconnecting wire 55 formed on the upper surface of the interlayer insulating film 19 jumper-connects the scanning line connection pad portion 2a formed on the upper surface of the glass substrate 1 and the first scanning line interconnecting wire 51 formed on the upper surface of the gate insulating film 12, it is possible to form such a jumper connection structure in other regions where it is required.

Next, three modified examples of such a jumper connection structure will be explained.

MODIFIED EXAMPLE 1

Figure 16:
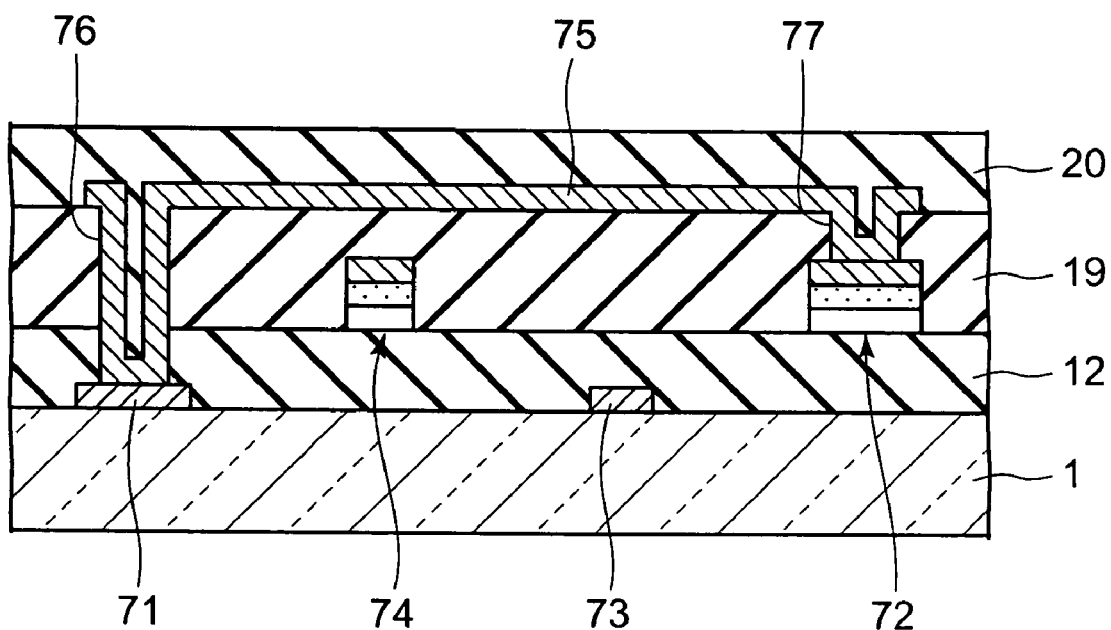
FIG. 16 is a cross sectional view shown for explaining a modified example 1 of a jumper connection structure.

FIG. 16 is a cross sectional view shown for explaining the modified example 1 of the jumper connection structure. Between a first lower wire 71 made of chromium or the like formed on the upper surface of the glass substrate 1 and a second lower wire 72 having the same three-layered structure as described above (hereinafter referred to simply as three-layered structure) formed on the upper surface of the gate insulating film 12, there are provided a third lower wire 73 made of chromium or the like formed on the upper surface of the glass substrate 1 and a fourth lower wire 74 having a three-layered structure formed on the upper surface of the gate insulating film 12. Also in this case, one end portion of an upper wire 75 made of high reflectivity metal such as aluminum-based metal, etc. formed on the upper surface of the interlayer insulating film 19 can be connected to the first lower wire 71 through a contact hole 76 formed in the interlayer insulating film 19 and gate insulating film 12, and the other end portion of the upper wire 75 can be connected to the second lower wire 72 through a contact hole 77 formed in the interlayer insulating film 19.

MODIFIED EXAMPLE 2

Figure 17:
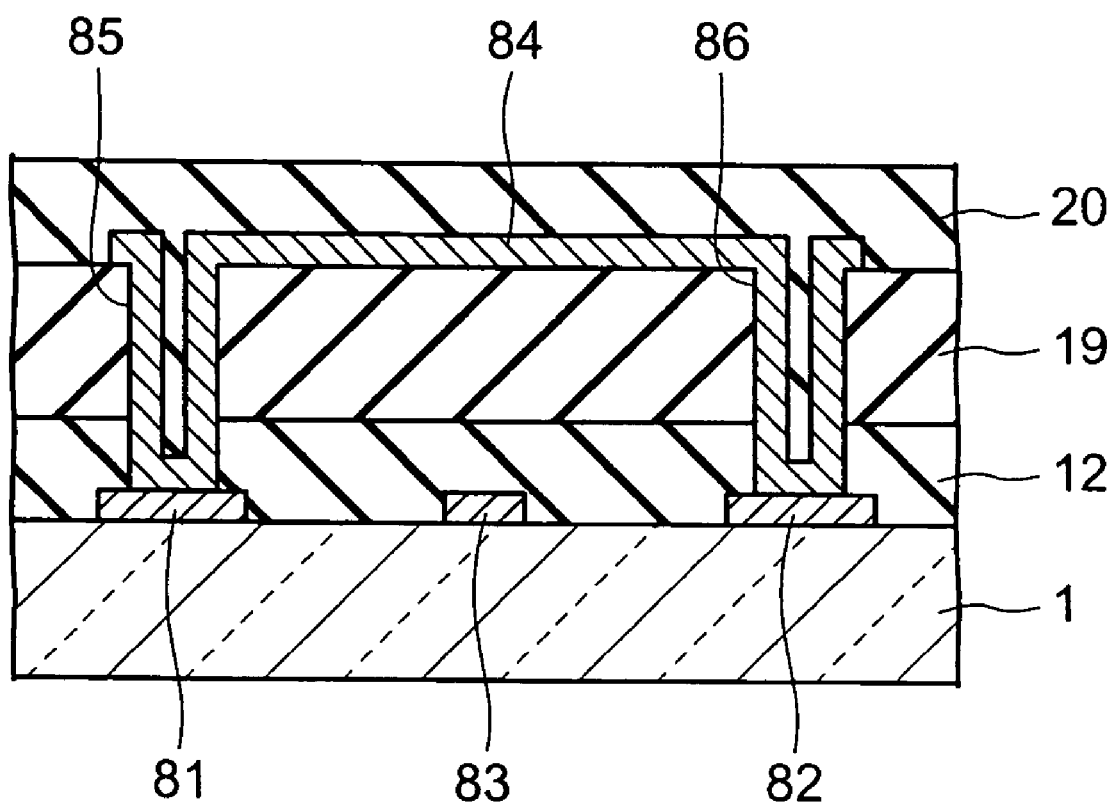
FIG. 17 is a cross sectional view shown for explaining a modified example 2 of a jumper connection structure.

FIG. 17 is a cross sectional view shown for explaining the modified example 2 of the jumper connection structure. Between a first lower wire 81 and second lower wire 82 which are made of chromium or the like and formed on the upper surface of the glass substrate 1, there is provided a third lower wire 83 made of chromium or the like formed on the upper surface of the glass substrate 1. Also in this case, one end portion of an upper wire 84 made of high reflectivity metal such as aluminum-based metal, etc. formed on the upper surface of the interlayer insulating film 19 can be connected to the first lower wire 81 through a first contact hole 85 formed in the interlayer insulating film 19 and gate insulating film 12, and the other end portion of the upper wire 84 can be connected to the second lower wire 82 through a second contact hole 86 formed in the interlayer insulating film 19 and gate insulating film 12.

MODIFIED EXAMPLE 3

Figure 18:
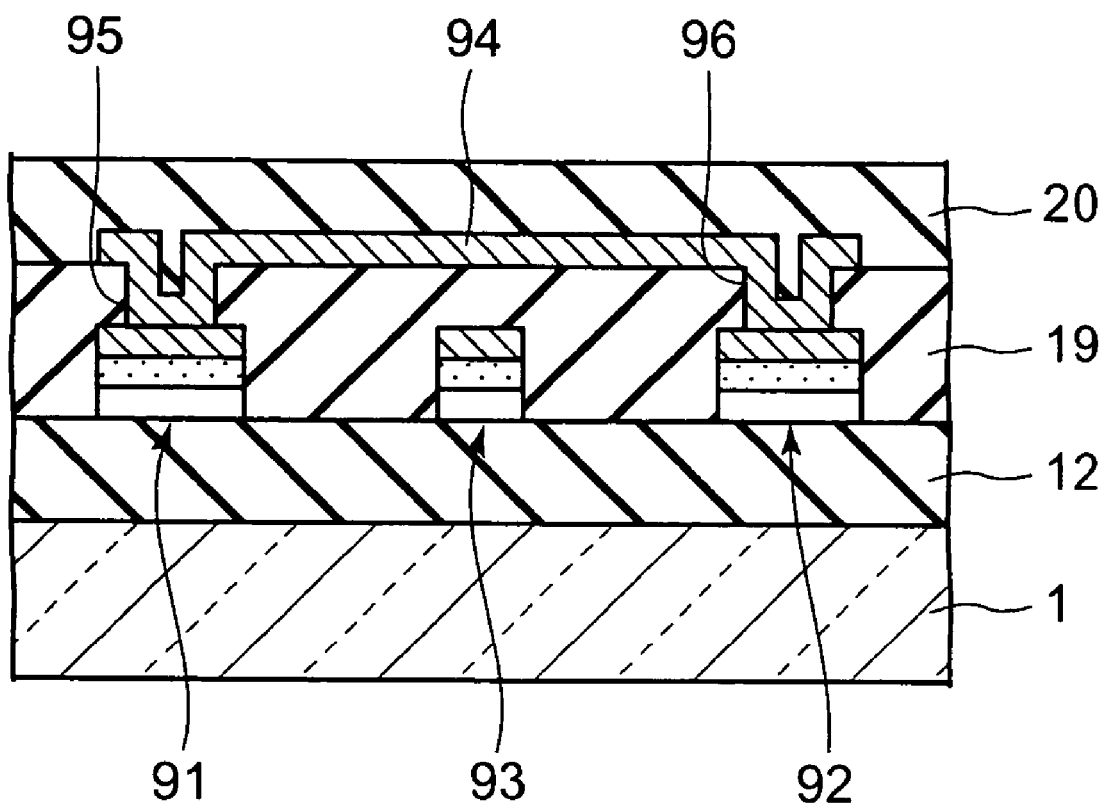
FIG. 18 is a cross sectional view shown for explaining a modified example 3 of a jumper connection structure.

FIG. 18 is a cross sectional view shown for explaining the modified example 3 of the jumper connection structure. Between a first lower wire 91 and second lower wire 92 which have a three-layered structure and are formed on the upper surface of the gate insulating film 12, there is provided a third lower wire 93 having a three-layered structure and formed on the upper surface of the gate insulating film 12. Also in this case, one end portion of an upper wire 94 made of high reflectivity metal such as aluminum-based metal, etc. formed on the upper surface of the interlayer insulating film 19 can be connected to the first lower wire 91 through a first contact hole 95 formed in the interlayer insulating film 19, and the other end portion of the upper wire 94 can be connected to the second lower wire 92 through a second contact hole 96 formed in the interlayer insulating film 19.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-348904 filed on Dec. 2, 2005 and including specification, claims, drawings and summary. The disclosure of the above Japanese Patent Application is incorporated herein by reference in its entirety.

What is claimed is:

1. A liquid crystal display device, comprising:
    a substrate;
    a switching element formed on the substrate;
    a data line connected to the switching element;
    an interconnecting wire formed on the substrate and insulated from the data line;
    an interlayer insulating film formed on the substrate so as to cover the switching element, the data line, and the interconnecting wire;
    an auxiliary capacitor electrode made of high reflectivity metal, which is formed on the interlayer insulating film and connected to the interconnecting wire;
    an upper insulating film formed on the interlayer insulating film so as to cover the auxiliary capacitor electrode; and
    a pixel electrode formed on the upper insulating film so as to be connected to another end of the switching element,
    wherein the interconnecting wire is made of a material different from that of the auxiliary capacitor electrode, and the interlayer insulating film and the upper insulating film have a contact hole which reaches the interconnecting wire.

2. The liquid crystal display device according to claim 1, wherein an interconnecting wire connection pad, which is connected to the interconnecting wire through the contact hole, is formed on the upper insulating film around the contact hole and an inside of the contact hole.

3. The liquid crystal display device according to claim 2, wherein the interconnecting wire connection pad is made of a transparent conductive material.

4. The liquid crystal display device according to claim 3, wherein a surface of the interconnecting wire is made of metal which is capable of forming an ohmic contact with the transparent conductive material.

5. The liquid crystal display device according to claim 1, wherein the switching element is a thin film transistor comprising a semiconductor thin film, ohmic contact layers, and source and drain electrodes, and the interconnecting wire has a stacked structure of layers, which are made of a same material as the semiconductor thin film, the ohmic contact layers, and the source and drain electrodes respectively.

6. The liquid crystal display device according to claim 1, wherein the data line and the interconnecting wire are formed on a same layer.

7. The liquid crystal display device according to claim 1, wherein the interlayer insulating film and the upper insulating film have a contact hole which reaches the data line, and a data line connection pad, which is connected to the data line through the contact hole, is formed on the upper insulating film around the contact hole.

8. The liquid crystal display device according to claim 7, wherein the switching element is a thin film transistor comprising a semiconductor thin film, ohmic contact layers, and source and drain electrodes, and the data line has a stacked structure of layers, which are made of a same material as the semiconductor thin film, the ohmic contact layers, and the source and drain electrodes respectively.

9. The liquid crystal display device according to claim 1, further comprising
a scanning line formed on the substrate and including a connection pad portion, and a lower insulating film formed between the substrate and the interlayer insulating film and including a contact hole corresponding to the connection pad portion,
wherein the switching element is a thin film transistor comprising a semiconductor thin film, ohmic contact layers, a gate electrode connected to the scanning line, and source and drain electrodes, and a scanning line interconnecting wire, which is electrically connected to the connection pad portion through the contact hole, is formed on the lower insulating film.

10. The liquid crystal display device according to claim 9, wherein the interlayer insulating film and the upper insulating layer have a contact hole, from which a part of the scanning line interconnecting wire is exposed.

11. The liquid crystal display device according to claim 10, comprising
a transparent conductive film connected to the scanning line interconnecting wire through the contact hole, formed on the upper insulating film around the contact hole.

12. The liquid crystal display device according to claim 9, wherein the interlayer insulating film has a contact hole from which the connection pad portion is exposed and a contact hole from which a part of the scanning line interconnecting wire is exposed, and the connection pad portion and the scanning line interconnecting wire are connected to each other by a conductive material provided in the contact hole from which the connection pad portion is exposed and the contact hole from which the part of the scanning line interconnecting wire is exposed.

13. The liquid crystal display device according to claim 12, wherein the conductive material is made of a same material as the auxiliary capacitor electrode.

14. The liquid crystal display device according to claim 1, further comprising
a lower insulating film formed between the substrate and the interlayer insulating film, wherein an upper wire made of a same material as the auxiliary capacitor electrode is formed on the interlayer insulating film, a first lower wire is formed under the lower insulating film, a second lower wire is formed above the lower insulating film, one end portion of the upper wire is connected to the first lower wire through a contact hole formed in the interlayer insulating film and the lower insulating film, and the other end portion of the upper wire is connected to the second lower wire through a contact hole formed in the interlayer insulating film.

15. The liquid crystal display device according to claim 14, wherein the switching element is a thin film transistor comprising a semiconductor thin film, ohmic contact layers, and source and drain electrodes, and the second lower wire has a stacked structure of layers, which are made of a same material as the semiconductor thin film, the ohmic contact layers, and the source and drain electrodes respectively.

16. The liquid crystal display device according to claim 1, comprising
a lower insulating film formed between the substrate and the interlayer insulating film,
an upper wire made of a same metallic material as the auxiliary capacitor electrode is formed on the interlayer insulating film, first and second lower wires are formed under the lower insulating film, one end portion of the upper wire is connected to the first lower wire through a contact hole formed in the interlayer insulating film and the lower insulating film, and the other end portion of the upper wire is connected to the second lower wire through a contact hole formed in the interlayer insulating film and the lower insulating film.

17. The liquid crystal display device according to claim 1, comprising
a lower insulating film formed between the substrate and the interlayer insulating film,
an upper wire made of a same metallic material as the auxiliary capacitor electrode is formed on the interlayer insulating film, first and second lower wires are formed above the lower insulating film, one end portion of the upper wire is connected to the first lower wire through a contact hole formed in the interlayer insulating film, and the other end portion of the upper wire is connected to the second lower wire through a contact hole formed in the interlayer insulating film.

18. A liquid crystal display device, comprising:
a substrate;
a thin film transistor formed on the substrate, and comprising a gate electrode, a semiconductor thin film, a source electrode, and a drain electrode;
a scanning line connected to the gate electrode;
a data line connected to the drain electrode;
an interconnecting wire made of a same material as the drain electrode;
an interlayer insulating film formed on the substrate so as to cover the thin film transistor and the interconnecting wire, and having first and second contact holes from which parts of the interconnecting wire are exposed;

an auxiliary capacitor electrode made of reflective metal, formed on the interlayer insulating film, and having a region connected to the interconnecting wire through the first contact hole;

an upper insulating film formed on the interlayer insulating film so as to cover the auxiliary capacitor electrode including the region, and having a third contact hole which connects with the second contact hole; and a pixel electrode made of a transparent conductive material, formed on the upper insulating film so as to be connected to the source electrode of the thin film transistor, and having a region which is overlaid above a part of the auxiliary capacitor electrode.

19. The liquid crystal display device according to claim 18, further comprising a connection pad made of a same material as the pixel electrode, formed on the upper insulating film around the third contact hole, and connected to the interconnecting wire through the second and third contact holes.

20. The liquid crystal display device according to claim 18, wherein the pixel electrode is made of ITO, and the auxiliary capacitor electrode is made of aluminum-based metal.

21. The liquid crystal display device according to claim 18, wherein the auxiliary capacitor electrode is made of light shielding metal, and has a portion which covers at least a channel region of the thin film transistor.

22. The liquid crystal display device according to claim 18, wherein the scanning line has a connection pad portion, the liquid crystal display device comprises a lower insulating film formed on the substrate so as to cover the gate electrode and the scanning line except the connection pad portion, and a scanning line interconnecting wire connected to the connection pad portion is formed on the lower insulating film.

23. The liquid crystal display device according to claim 22, wherein the interlayer insulating film has a contact hole from which the connection pad portion is exposed and a contact hole from which a part of the scanning line interconnecting wire is exposed, and the connection pad portion and the scanning line interconnecting wire are connected to each other by a conductive material provided in the contact hole from which the connection pad portion is exposed and the contact hole from which the part of the scanning line interconnecting wire is exposed.

24. The liquid crystal display device according to claim 23, wherein the upper insulating layer and the interlayer insulating layer have a contact hole from which a part of the scanning line interconnecting wire is exposed.

25. The liquid crystal display device according to claim 24, wherein a connection pad, which is made of a same material as the pixel electrode and connected to the scanning line interconnecting wire through the contact hole, is formed on the upper insulating film around the contact hole.

* * * * *